United States Patent [19]
Palmer et al.

[11] Patent Number: 5,996,785
[45] Date of Patent: Dec. 7, 1999

[54] DETACHABLE MODULE AND FLAT OBJECT STORAGE SYSTEM

[75] Inventors: Christopher G. Palmer; Peter J. Palmer, both of Saratoga; Steven A. Gelphman, San Jose, all of Calif.

[73] Assignee: The Mead Corporation, Dayton, Ohio

[21] Appl. No.: 09/036,943

[22] Filed: Mar. 9, 1998

Related U.S. Application Data

[63] Continuation-in-part of application No. PCT/US97/00022, Jan. 3, 1997
[60] Provisional application No. 60/009,597, Jan. 4, 1996.

[51] Int. Cl.$^6$ .................................................. B65D 85/57
[52] U.S. Cl. ...................... 206/308.1; 206/311; 206/425
[58] Field of Search ..................... 206/308.1, 309–313, 206/232, 425

[56] References Cited

U.S. PATENT DOCUMENTS

| | | |
|---|---|---|
| D. 258,897 | 4/1981 | Glaubinger . |
| D. 300,148 | 3/1989 | Osofsky et al. . |
| D. 303,042 | 8/1989 | Mackey . |
| D. 323,428 | 1/1992 | Wang . |
| D. 333,610 | 3/1993 | Oshry et al. . |
| 1,287,842 | 12/1918 | Betts . |
| 4,263,357 | 4/1981 | Holson . |
| 4,327,831 | 5/1982 | Inaba et al. . |
| 4,508,366 | 4/1985 | Brindle . |
| 4,602,447 | 7/1986 | Feingold . |
| 4,778,047 | 10/1988 | Lay . |
| 4,781,292 | 11/1988 | Sacherman et al. .................. 206/308.1 |
| 4,850,731 | 7/1989 | Youngs . |
| 4,906,057 | 3/1990 | Davi et al. . |
| 5,027,950 | 7/1991 | Gutierrez et al. ..................... 206/308.1 |
| 5,096,064 | 3/1992 | Rufo, Sr. et al. ..................... 206/308.1 |
| 5,154,284 | 10/1992 | Starkey . |
| 5,176,250 | 1/1993 | Cheng . |
| 5,295,577 | 3/1994 | Minter . |
| 5,307,926 | 5/1994 | Mee . |
| 5,385,235 | 1/1995 | Ikebe et al. .......................... 206/308.1 |
| 5,392,906 | 2/1995 | Taniyama . |
| 5,392,913 | 2/1995 | Merrick . |
| 5,415,291 | 5/1995 | Fukagawa . |
| 5,513,749 | 5/1996 | Simmons ............................. 206/308.1 |
| 5,520,279 | 5/1996 | Lin . |
| 5,531,324 | 7/1996 | Kosaki et al. ........................ 206/308.1 |
| 5,540,328 | 7/1996 | Kohtake ............................... 206/308.1 |
| 5,555,977 | 9/1996 | Oshry et al. . |
| 5,558,219 | 9/1996 | Staubitz et al. ....................... 206/308.1 |
| 5,715,937 | 2/1998 | Oshry et al. . |

*Primary Examiner*—Paul T. Sewell
*Assistant Examiner*—Luan K. Bui
*Attorney, Agent, or Firm*—Thompson Hine & Flory LLP

[57] ABSTRACT

For storage of storage media (22), a sleeve (10) having one or two storage pocket (20) formed between an optional substrate (16) and two cover plates (18). The sleeves (10) in turn may be mounted on a spine (12) having a plurality of vertebrae (56) connected by flexible hinges (60). The sleeves (10) mount on respective vertebrae (56) by slidable insertion of mounting slots (54) onto mounting tracks (58). The flexible hinges (60) then permit easy user access to and review of the storage media (22) contents of individual sleeves (10) in an intuitive roll-and-tumble manner. The sleeves (10) and the spine (12) may in turn also be stored in a clam-shell style case (88) or a wallet style case (108), or loose sleeves (10) may be stored in a tray (118).

26 Claims, 8 Drawing Sheets

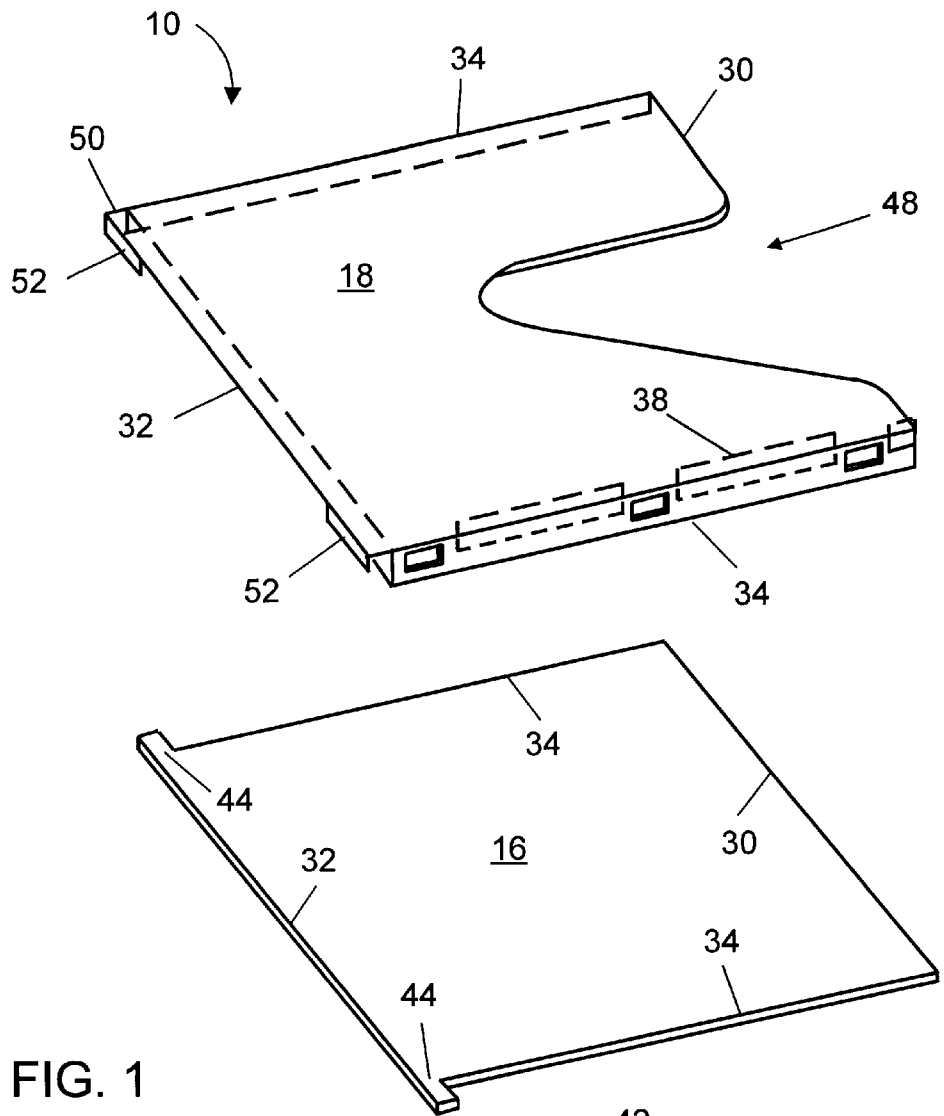
FIG. 1
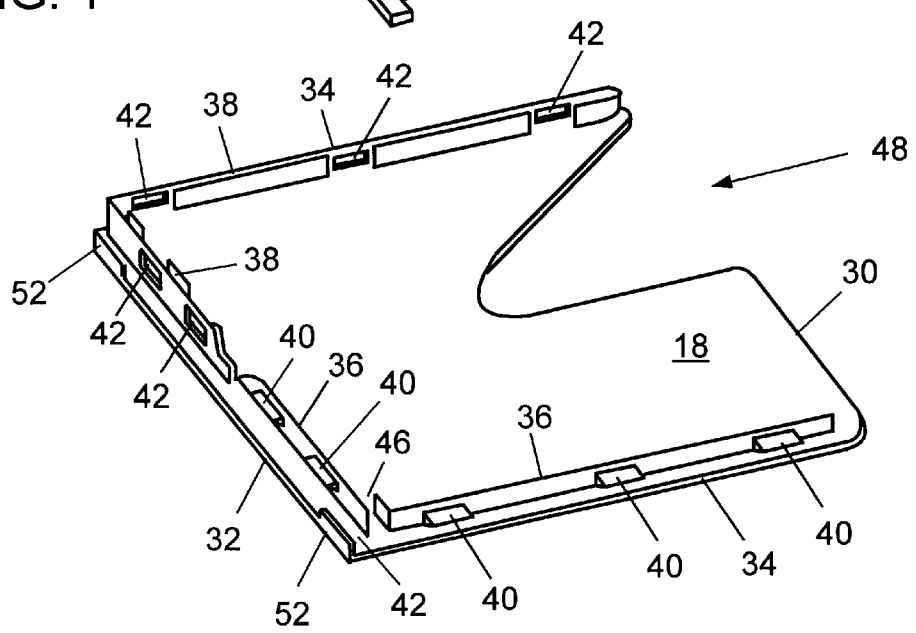

DETACHABLE MODULE AND FLAT OBJECT STORAGE SYSTEM

CROSS-REFERENCE TO RELATED APPLICATIONS

This application is a continuation in part of Patent Cooperation Treaty application PCT/US97/00022, filed Jan. 03, 1997, titled "DETACHABLE MODULE DISC AND FLAT OBJECT STORAGE SYSTEM," by inventors Peter J. Palmer, Chistopher G. Palmer, and Steven A. Gelphman; which in turn claims the benefit of U.S. Provisional Application Ser. No. 60/009,597, filed Jan. 04, 1996, also titled "DETACHABLE MODULE DISC AND FLAT OBJECT STORAGE SYSTEM," by inventors Peter J. Palmer and Christopher G. Palmer.

TECHNICAL FIELD

The present invention relates generally to storage systems for providing protection for and access to generally planar objects, and more particularly to units for storing and displaying variously shaped storage media. The preferred embodiment of the present invention is particularly adapted to space saving yet highly accessible storage of such storage media in an easily transportable manner separate from any of the associated cases in which they are typically sold. Some embodiments of the invention are also suited for handling the associated and similarly sized literature which comes with some types of these storage media. Further, multiple instances and modular assemblies of the present invention are easily combined as desired into larger assemblies, permitting easy expansion of overall storage capacity and a high degree of library organizing capability.

BACKGROUND ART

One of the most popular forms of recording information today is on various storage media, which can be roughly classified into two general shapes: disc-shaped and box-shaped.

The term disc media and the abbreviation "DM" are used in a generic sense herein to include, without limitation, media such as music compact discs (CD), CD ROM computer media, digital versatile disks (DVD), digital video discs, laser discs, disk-shaped floptical discs (i.e., those not housed in box-shaped cartridges), and other relatively flat yet disk shaped data storage.

Similarly, the term cartridge media and the abbreviation "CM"0 are used in a generic sense herein to include, again without limitation, 5¼" and 3½" computer floppy-disks, disk-in-cartridge computer storage formats (e.g., ZIP disks, T/M of IOMEGA, Inc.), CD ROM's in the carriers required by some CD drive playback units, digital audio tapes (DAT), video tapes, floptical discs in cartridges, and other relatively flat yet box-shaped data storage media. Admittedly, the actual media within such CM may be a disk, a bank of disks, tape on reels, or still some other mechanism, but since it is the overall exterior shape which effectively dictates physical handling needs for storage the CM vs. DM distinction is useful for the following discussion.

Further, particularly with DM such as CD's, DVD's, and CD ROM's, it has become common to include small printed pamphlets or booklets which describe the contents, instruct on the use and preservation of the media (particularly if used to store computer data), or to provide content related information (e.g., a limited biography of the band whose music is recorded on a music CD, or installation instructions for computer software stored on a CD ROM). It therefore follows that attendant with the proliferation of DM and CM there has also developed a need for storage of such related media literature (hereinafter "ML"), preferably along with the associated DM and CM units themselves, and even more preferably in a manner which denotes specific individual associations.

In the case of all of these potential objects for storage, DM, CM, and ML (collectively "storage media"), there is usually one particular side bearing key identifying indicia which it is desirable that user be able to easily read even during storage. For example, DM, such as CD's, usually have a user informative side and a data storage side, and it is desirable that the user informative side be easily read without removing individual the CD's from the storage system, which may actually contain a large number of CD's.

As implied above, with the proliferation of storage media, a need has come for storing a multitude of units, and it has become typical practice for users to even maintain large libraries, sometimes of hundreds of units. Many storage media are contained within bulky storage cases when first purchased by consumers (e.g., jewel boxes for music compact discs and cardboard sleeves for video tapes), and many present library storage systems retain the bulky original container, despite the fact that it is often far more bulky than the storage media itself. Thus, as libraries of storage media grow, many users are impressed with a need for reducing space requirements, and there have accordingly been various attempts at alternate storage systems. Unfortunately, these systems have suffered from a number of limitations which have limited their acceptance. As with any library storage system, users seek improved accessibility, index ability, aesthetics, and reduced cost. Comprehensive library storage is also increasingly important. For example, most outside-of-the-original-container storage systems have not included provision for storage of ML, and particularly lacking has been systems which store ML in a readily accessible manner associated with the particular the DM or CM units which the ML originally came with.

Another user concern is that most prior art systems have not included provision for easy storage expansion in convenient increments. Such storage systems usually have a module capacity of 5, 10, or 20, which requires that capacity be incremented in units of 5, 10 or 20 when storage for only one or two additional units is really needed.

Further, as society as become increasingly mobile and as data information retrieval equipment has grown smaller and more portable, transportability and robustness of library storage systems for storage media have become increasingly important.

While some prior art systems have addressed some of the above noted concerns, none have suitably addressed them all, and today there remains a need for improved storage media storage systems.

DISCLOSURE OF INVENTION

Accordingly, it is an object of the present invention to provide a system for storing an intermediate number of storage media, which may be either disk media ("DM"), cartridge media ("CM"), associated media related literature ("ML"), or combinations thereof.

It is another object of the present invention to store individual storage media without the bulky containers in which they usually are purchased, yet in a manner which makes them readily accessible and visible for selection purposes.

It is another object of the present invention to provide a storage system for storage media which is esthetically pleasing, both from visual and tactile standpoints.

It is yet another object of the present invention to provide a storage system in which single handed manipulation permits the user to access the library for selection of individual storage media in a rapid and predictable fashion.

Briefly, one preferred embodiment of the present invention is a storage system for storing a number of storage media such as disk media and cartridge media, as well as the somewhat similarly dimensioned literature typically associated with such media. The storage system includes a number of substantially rectangular sleeves which are each suitable for insertably receiving and storing at least one unit of the storage media within a storage pocket between two flat cover plates. The sleeves and cover plates have an entry edge where the storage media enters, a back edge opposite that entry edge, and side edges extending between the entry and back edges. A number of vertebrae are provided which each include a mounting track suitable for receiving and mounting one of the sleeves at either its back edge or one of its side edges. The mounting track and the mounting edge then are held in a substantially parallel mated relationship. A spine is also provided which is connected to the vertebrae. Finally, a housing suitable for containing the assemblage of the spine, the vertebrae, the sleeves, and any storage media contained in the sleeves is also provided.

An advantage of the present invention is that individual storage media may be readily and sequentially displayed for viewing and access to the user.

Another advantage of the present invention is that the user informative sides, e.g., the entire labels of music CDs (regardless of the rotational orientation) or the entire cover sheets of ML are presented and may be made visible to the user for ready viewing and access without removal from the storage system.

Another advantage of the present invention is that can be employed in a structure which can be single handedly manipulated by the user for rapid, convenient, and predictable sequential viewing of the contents.

Another advantage of the present invention is that the components may be modularly constructed for uniformity and economy of manufacture.

Another advantage of the present invention is that it is readily adapted for usage with a large number of units of storage media. In particular, the invention may be initially constructed to accommodate small numbers of storage units, but still easily permit expanding the storage capacity later. Such capacity expansion may be accomplished either by adding additional modular sections to individual instances of the inventive storage system, or by combining instances of the invention together to form a larger overall storage scheme.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 1 is an exploded perspective view of a sleeve used in a first embodiment of the inventive storage system;

FIG. 4a is a top side view of a sleeve using override bumps to retain storage media, while FIG. 4b is a close cut-away view of details of a left suitable override bump, and while

BEST MODES FOR CARRYING OUT THE INVENTION

Figure 2:
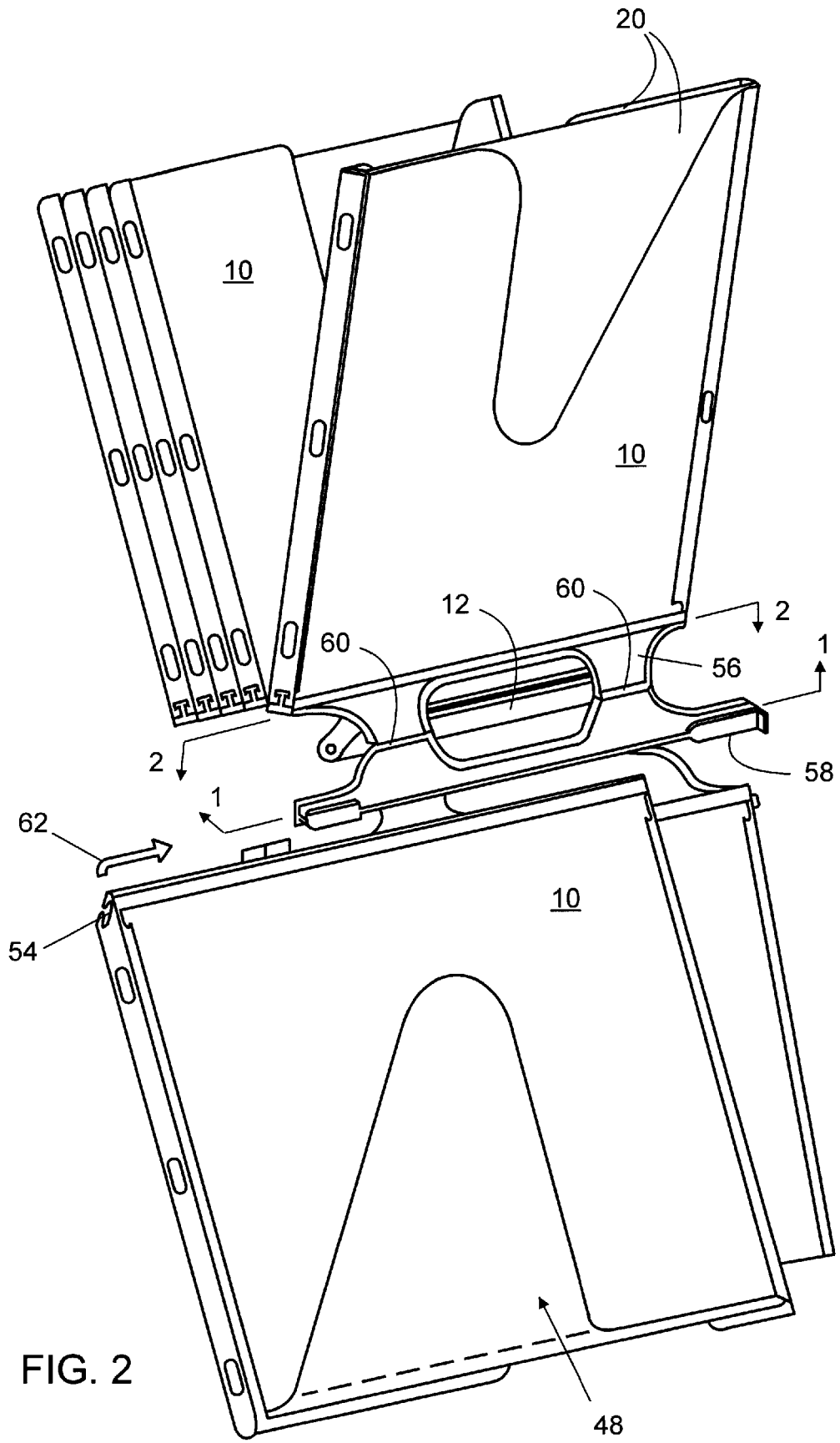
FIG. 2 is a perspective view of a number of the sleeves of FIG. 1 mounted on vertebrae of a spine, with FIG. 2a a detailed view of section 1—1 in FIG. 2 and FIG. 2b a detailed view of section 2—2 in FIG. 2.

The present invention includes a system of sleeves which may optionally be mounted on spines. In turn, the sleeves and spines in combination with a housing may form an overall storage system. The preferred embodiments of these are illustrated in the various figures, with the view of FIG. 1 particularly depicting the inventive sleeve and identifying it by the general reference character 10, the view of FIG. 2 particularly depicting the inventive spine and identifying it by the general reference character 12, and the views of FIGS. 5, 6, and 7 particularly depicting respective variations the storage system as a whole, and identifying these variations with the general reference characters 14a, 14b, and 14c.

Figure 3:
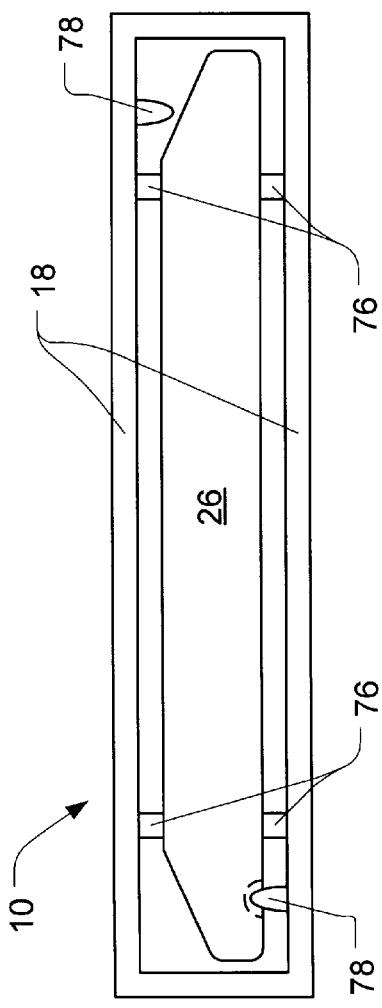
FIG. 3 is an entry side view of a sleeve loaded with a cartridge type storage media.
Figure 4A:
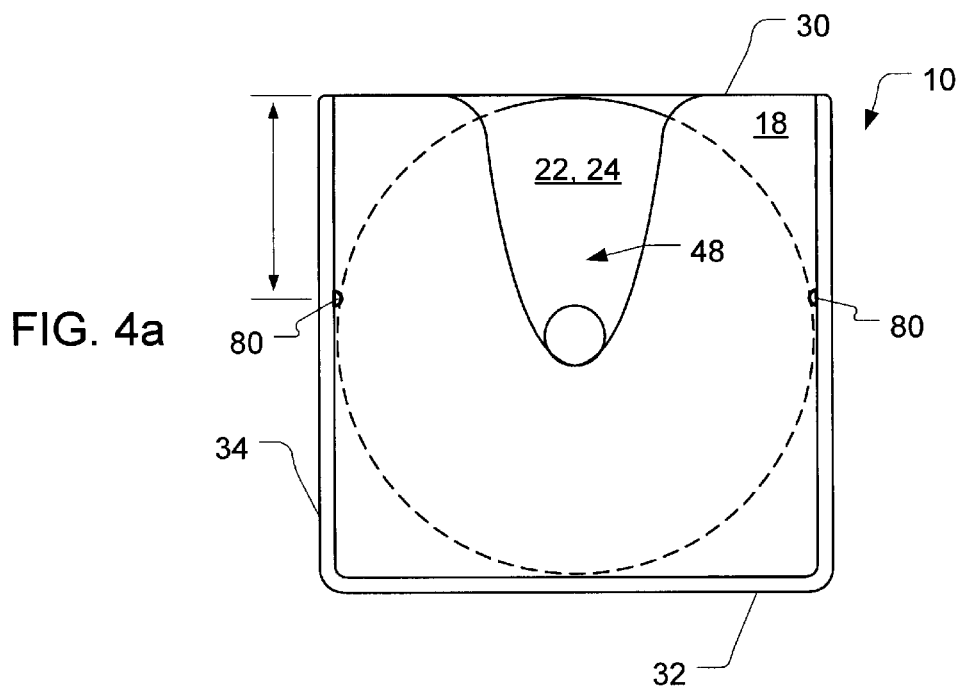

FIG. 1 illustrates in exploded perspective view one instance of the inventive sleeve 10. Included are an optional substrate 16 and two cover plates 18. Depending upon whether the substrate 16 is present, when the sleeve 10 is assembled (see e.g., FIG. 2) either one or two storage pockets 20 are formed which are each suitable for insertion of a unit of storage media (SM 22). Throughout the following discussion when the SM 22 is specifically a disk type media, a cartridge type media, or media related literature, the respective terms "DM 24," "CM 26," or "ML 28" are instead used. An example DM 24 is shown in FIG. 4a in ghost view, and an example CM 26 is shown in FIG. 3 in a side view. No examples of ML 28 are shown in the figures.

The substrate 16, the cover plates 18, and the storage pockets 20 formed therewith are all roughly rectangular in shape, and all accordingly can be defined as having an entry edge 30, which is that edge at which a unit of SM 22 is inserted; a back edge 32, opposite the entry edge 30; and a pair of side edges 34.

When the sleeves 10 are intended for storage of SM 22 which have an exposed data information bearing side, such as common CM 26 like CD's and CD ROM's, the substrate 16 may be made of a non-scratching type material (e.g., a soft, low-friction, or highly polished material). The SM 22 can then be inserted into the storage pockets 20 with the information bearing side adjacent to the substrate 16, to protect the critical data thereon. This also orients the user information side of the SM 22 outward for easy user observation. And since it is anticipated that the cover plates 18 will typically be made of transparent material (e.g., a clear plastic) to facilitate reading the surfaces of stored SM 22, the substrate 16 may be made of an opaque material so that users may readily discern whether a topmost storage pocket 20 is occupied, without confusion with an occupied lower storage pocket 20.

Various techniques may be used to assemble the cover plates 18. FIG. 1 shows features used in a preferred technique which works well for sleeves 10 used to store lighter and less massive SM 22. In FIG. 1 the cover plates 18 employ a system of engaging tongues 36 and grooves 38 around the back edge 32 and the side edges 34. The particular arrangement of these tongues 36 and grooves 38 is not critical, so long as they permit the cover plates 18 to snap together during assembly. To retain the cover plates 18 together after such assembly a series of corresponding locking notches 40 and locking holes 42 are provided in the tongues 36 and grooves 38. If desired, the cover plates 18 may be made the same, as are the those illustrated in FIG. 1, or they may be different. These features all facilitate simple assembly and a reduced parts count.

Some other suitable methods, not illustrated, of locking the cover plates 18 together include gluing and sonic welding, and particularly for larger units the sleeves 10 may simply be molded as a single unit.

When present, the substrate 16 can be retained in place between the cover plates 18 in a number of manners. The method shown in FIG. 1 employs a pair of retention ears 44, one located on each side edge 34 of the substrate 16 near the back edge 32. These two retention ears 44 engage with a pair of retention recesses 46, one each in the sandwiching cover plates 18, in a manner such that the substrate 16 is captured and cannot escape from between the cover plates 18, even as users later repeatedly slide SM 22 into and out of the storage pockets 20.

An optional, but highly useful feature in each cover plate 18 is an access slot 48. This provides a means for users to easily withdraw a SM 22 from a storage pocket 20. The access slot 48 preferably extends into a cover plate 18 deep enough that a user can engage their fingertip in any center feature present in a SM 22 which is stored in a storage pocket 20 (see e.g., FIG. 4a), for adequate purchase to remove the SM 22. CM 26 such as CD's and CD ROM's are examples of some typical SM 22 having such center features.

Considerable variation in the shape of an access slot 48 is possible. FIGS. 1 and 2 show a roughly right-triangle shape for right-handed users, and FIG. 4a shows an alternate which is roughly symmetrical and parabolic in shape. As a peripheral benefit, the use of relatively sizable access slots 48 also permit use of less material to manufacture the cover plates 18, and accordingly less press pressure if the manufacturing method is pressure molding.

A key feature of the inventive sleeve 10 is optional mountability on the inventive spine 12. As depicted in FIG. 1, in each cover plate 18 includes an extended region 50 alone its back edge 32, and at least one mounting tang 52 at the extreme of its back edge 32. As can be appreciated from FIG. 2, when two cover plates 18 have been assembled to form a sleeve 10 a mounting slot 54 is formed along the back edge 32 of the sleeve 10.

The mounting tangs 52 may extend the entire length of the back edge 32, but for less massive types of SM 22 the inventors prefer to use two mounting tangs 52 located at opposite ends of the back edge 32 of each cover plate 18. This arrangement provides four mounting tangs 52 on each sleeve 10, two in opposition at each end of the mounting slot 54, which provides adequate strength and mounting stability while also saving material.

FIG. 2 illustrates a number of the sleeves 10 mounted on the inventive spine 12. The spine 12 includes a number of vertebrae 56, each containing a mounting track 58. The sleeves 10 are engaged to corresponding vertebrae 56 by sliding the mounting slot 54 over the mounting track 58, in the manner depicted by arrow 62.

The vertebrae 56 are attached in a series to the spine 12. In the preferred embodiment, where plastic is the material of construction, the method of vertebrae 56 to spine 12 attachment is a flexible hinge 60 (also sometimes referred to as a "piano hinge"), but other styles of hinge may of course also be used.

In particular, the use of a hinge here, such as the flexible hinge 60, imparts the significant benefit that a series of mounted sleeves 10 can be accessed in a roll-and-tumble manner by a user for SM 22 selection. This roll-and-tumble action is analogous in many ways to how pages can be turned in a book, with the pulling of one page also turning sequential pages merely by forces transferred through the book spine. It should be noted that the sleeves 10 have no direct attachment to one another, since they attach to the vertebrae 56, which in turn are attached to the spine 12. In visual appearance, this type of operation somewhat resembles that of some common card files (e.g., those sold under the ROLODEX trademark), but the actual manner of operation here is quite different.

Figure 2A:
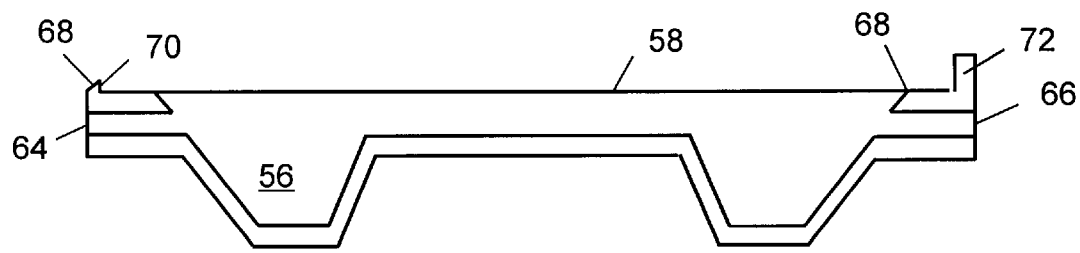

FIG. 2a, which is a view along section 1—1 in FIG. 2, depicts particular details of an empty mounting track 58. The mounting track 58 has both an entry end 64 and a stop end 66, each of which has a leading taper 68 to permit easy engagement with the mounting slot 54 of a sleeve 10. The entry end 64 includes an upward depending stop dimple 70, to assist in retaining a mounted sleeve 10 on a mounting track 58. Further, the stop end 66 includes a stop tab 72, to prevent a mounted sleeve 10 from sliding too far along the mounting track 58. Of course the stop end 66 can de dispensed with entirely, and two entry ends 64 provided instead.

Figure 2B:
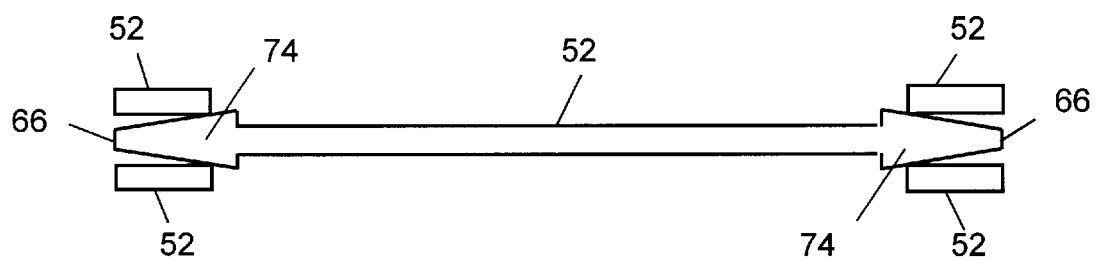

Retention of the sleeves 10 on the vertebrae 56 of the spine 12 can be also provided in a number of manners. As noted above, the stop dimple 70 contributes to this goal. Another method is to have a slight interference fit between the entire mounting track 58 of the vertebrae 56 and the mounting tangs 52 of the sleeve 10. And yet another method is to have depressions to accept the mounting tangs 52 in a snap-in manner, say at the stop end 66 of the mounting track 58. However, as depicted in FIG. 2b, which is a view along section 2—2 of FIG. 2, the preferred embodiment of the mounting track 58 instead uses ramped regions 74 at both ends of the mounting track 58. These ramped regions 74 are opposed, and make the mounting track 58 narrowest at its extremes. The ramped regions 74 partially form interference fits with the mounting tangs 52 of the sleeves 10 in the manner shown, thereby urging centering and further causing a mounted sleeve 10 to be held firmly in position upon a mounting track 58.

In the preceding discussion, the back edge 32 of the sleeve 10 has been that described as having the mounting slot 54. However, those skilled in the art will also readily appreciate that either of the side edges 34 could have the necessary features provided (e.g., the extended region 50 and mounting tangs 52), and the sleeve 10 could then be side mounted accordingly.

It is generally desirable to be able to hold the SM 22 within the storage pockets 20, and this also may be accomplished in various manners. First, it may be done by suitably dimensioning the tongues 36 and grooves 38 so that the overall thickness of the sleeves 10 slightly compressably holds the SM 22 in place. The sleeves 10 depicted in FIG. 1 and FIG. 2 work well in this manner, with any present substrate 16 also playing a role in this scheme. This technique works for all shapes and sizes of SM 22, but it is particularly well suited for use on smaller and lighter SM 22, such as CD type DM 24 or CD associated ML 28.

Second, as illustrated in FIG. 3 which is a view into the entry edge 30 of a large type sleeve 10 containing a common CM 26, the cover plates 18 may be provided with compression rails 76, typically at least two, on either one or both cover plates 18. This rail based variation also operates by compressably retaining the SM 22 in place within the sleeve 10, but it makes considerably less surface contact with the SM 22. By proper placement of the compression rails 76 for a particular type of SM 22, this variation may even be used to avoid contact with sensitive parts of the SM 22. This rail based variation also works well for larger and more massive SM 22, particularly when relatively rigid material is used for the cover plates 18 and the overall sleeve 10 is stiff.

Third, as concurrently illustrated in FIG. 3, the cover plates 18 may be provided with projections 78 which engage with particular features of the SM 22. In FIG. 3 the CM 26 is depicted having a cavity (shown in ghost form) on its lower side and tapers on its upper side which extend downwards towards its side edges. Both cover plates 18 are provided with the projections 78, to engage with the lower side cavity of an inserted instance of the particular CM 26, but the unused projection 78 is avoided due to the upper side tapering of the CM 26. An example of the particular shape of CM 26 envisioned here is the ZIPDISK (T/M IOMEGA Corporation).

Figure 4B:
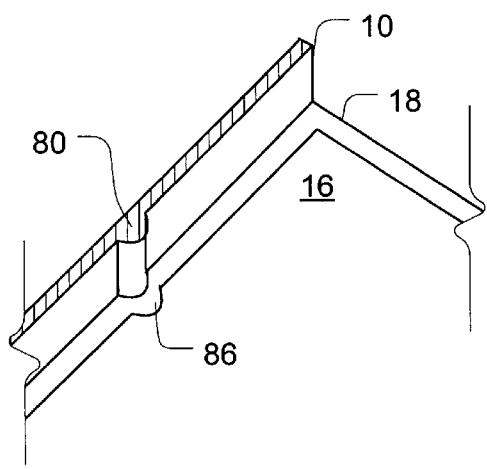
Figure 4C:
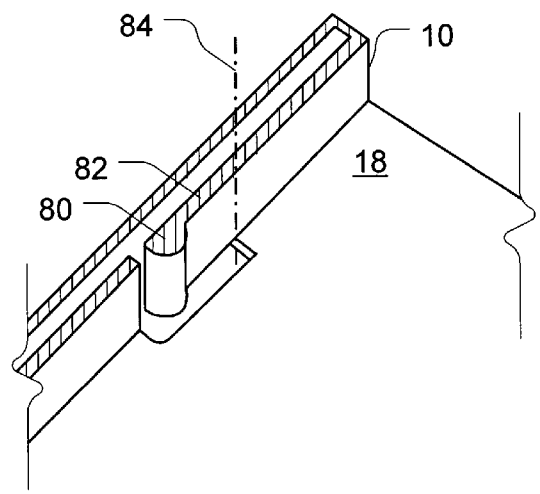
FIG. 4c is a close cut-away view of details of an alternate override bump design.

Fourth, as illustrated in FIG. 4a–c, an override bump 80 may be provided in one or both side edges 34. When the above described snap-together types of cover plates 18 are used the override bumps 80 can easily be added as part of the tongues 36 and grooves 38 system provided (FIG. 1). If the sleeves 10 are sized for smaller or lighter SM 22 and the material of construction is relatively flexible, e.g., plastic, the override bumps 80 can simply be made directly part of the side edge 34, as shown in FIG. 4a–b. Alternately, if the SM 22 needs to be more positively retained in place, say because the SM 22 is inherently large or massive, or if the construction material of the cover plates 18 is less than optimally flexible, the override bumps 80 can be placed on a flexible rib 82 which pivotally bends about an axis 84, as shown in FIG. 4c. The override bumps 80 may be made rounded and standing out about 0.020" to 0.040" for typical DM 24 like CD's, as shown in FIG. 4b. This works particularly well for retaining DM 24 in storage pockets, as shown in FIG. 4a where the override bumps 80 are shown as spaced about 2" in from the entry edge 30 to well retain a standard sized CD (the DM 24 type SM 22 shown in ghost view) in the sleeve 10. Of course the override bumps 80 do not necessarily have to be rounded or spaced inward along the side edges 34. The nature of the SM 22 or simply aesthetic or design preference may motivate the choice of shape, size, and placement of the override bump 80. For example, for generally box-shaped CM 26 the use of rib 82 mounted and pad-shaped override bumps 80 located very near the entry edge 30 may be desirable, or if the CM 26 needs to be very securely retained even multiple override bumps 80 along one or both side edges 34 may be used. Finally, as depicted in FIG. 4b, when a substrate 16 is present, slots 86 can be proved which correspond which respective override bumps 80.

Figure 5A:
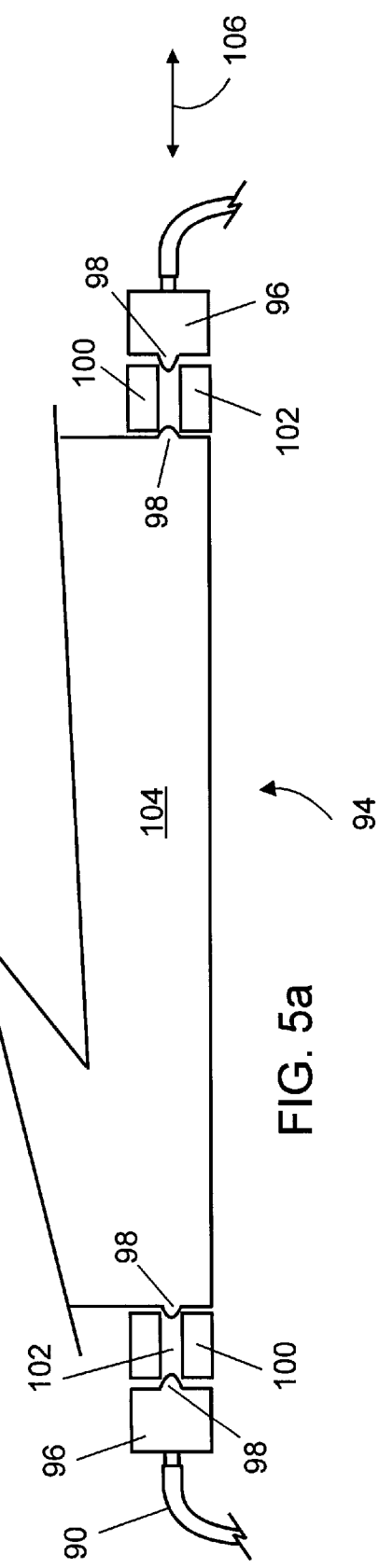
FIG. 5 is a perspective view of a clam-shell style case for storage of the spine and sleeves assembly of FIG. 2, with FIG. 5a a detailed view of section 1—1 in FIG. 5.
Figure 5:
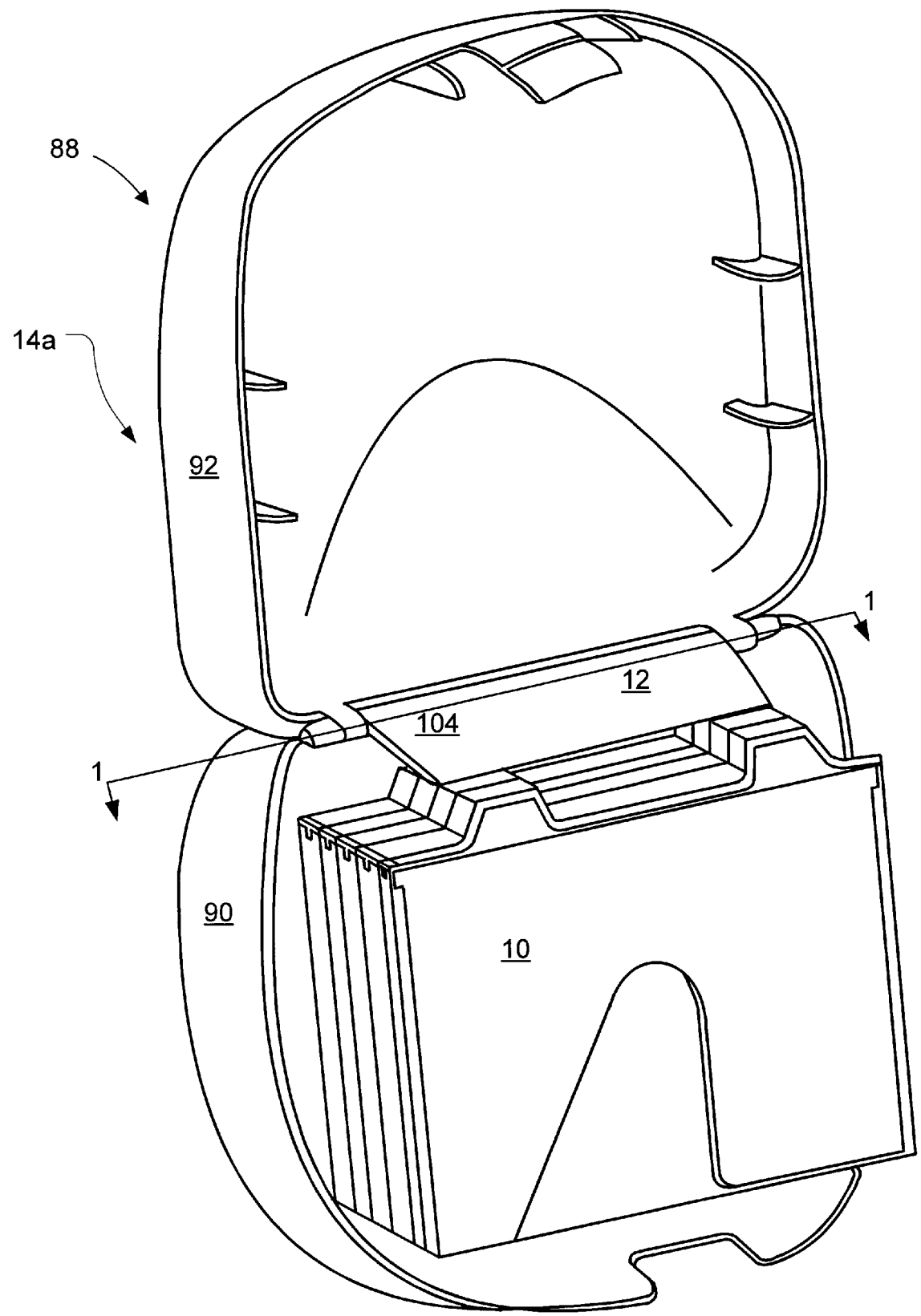

FIG. 5 depicts a container suitable for storage of the inventive sleeves 10, forming a storage system 14a variation. A clam-shell type case 88 is provided having a bottom case section 90 and a top case section 92. The case 88 accepts the spine 12 of FIG. 2, and permits easy and protected transport of a multiplicity of the sleeves 10 in a very compact yet highly protected manner. Typical desirable increments of sleeves 10 which can be stored in this manner are 5, 8, 10, 12, and even more. Accordingly, cases 88, such as that shown in FIG. 5, can be designed to accept appropriately sized spines 12. In the preferred embodiment the spine 12 is made part of a hinge assembly 94 of the case 88.

FIG. 5a, depicting section 1—1 of FIG. 5, shows particular details of this hinge assembly 94. The bottom case section 90 has provided two outer hinge teeth 96, each having a dimple 98 which is inward depending. The top case section 92 has provided two middle hinge teeth 100, each having a through bore 102. The spine 12 has an inner hinge tooth 104, which has two opposed dimples 98 which are outward depending. The dimples 98 here act much in the manner of a conventional hinge pin. They engage the through bores 102 of the middle hinge teeth 100 to hold all of the teeth (outer hinge teeth 96, middle hinge teeth 100, and the inner hinge tooth 104) in rotatable alignment about axis 106. Since plastic is the preferred material for construction of the case 88, use of the dimples 98 (rather than a conventional hinge pin, for example) permits easy snap-together assembly and disassembly of the case 88.

Figure 6:
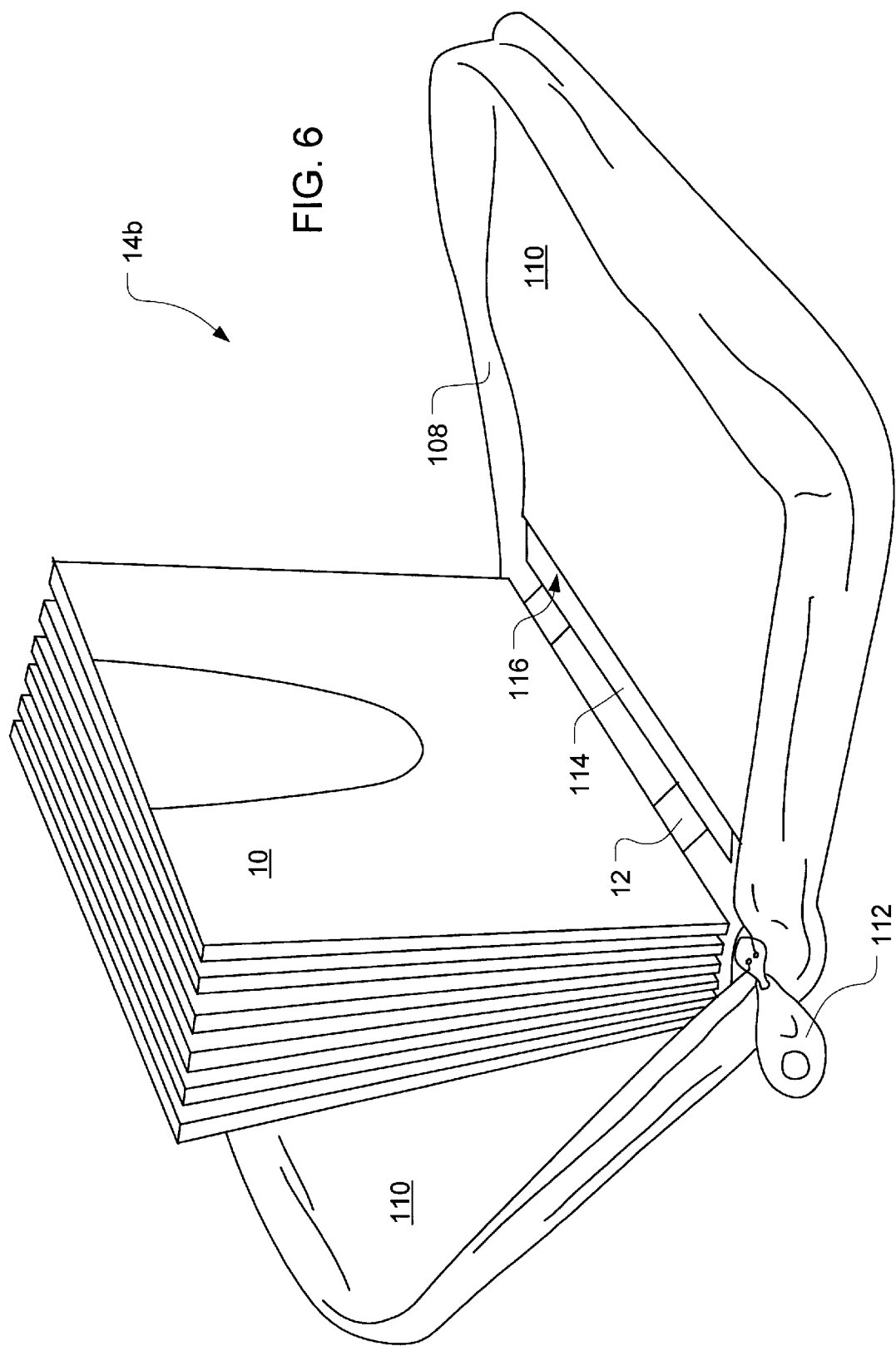
FIG. 6 shows a wallet style housing for containing a number of the sleeves of FIG. 1 mounted on a spine.

FIG. 6 depicts a storage system 14b variation. A soft sided wallet 108 is provided having two connected walls 110 and optionally a closing mechanism 112 to seal the wallet 108 closed. The walls 110 may be any of various materials, with flexible plastic sheet and fabric being two good examples. Examples of suitable closing mechanisms 112 include zippers (depicted in FIG. 6), tongue in groove systems (e.g., the T/M ZIPLOCK type closure system commonly used to seal plastic bags), and hook and loop systems (e.g., the T/M VELCRO system).

FIG. 6 also depicts a variation of the spine 12, one which rather than using the centrally located inner hinge tooth 104 shown in FIG. 5a instead uses end flaps 114 on the spine 12 which attach to the wallet 108. In the inventor's preferred embodiment the end flaps 114 insert loosely into pockets 116 in the walls 110 of the wallet 108. This provides the particular benefit that the previously noted roll-and-tumble action for the sleeves 10 may be accomplished here by merely pulling on or manipulating only the walls 110 of the wallet 108 (much like one can grasp a book only by its covers and fan the pages). A more solid connection of the spine 12 into the wallet 108 can, of course, also be used, but the inventors have found that this loose variation works well and is in keeping with the goal of flexibility. The end users of the storage system 14 may easily expand capacity, by moving spine 12 and sleeves 10 assemblies into different sized cases 88 or wallets 108 as desired.

Figure 7:
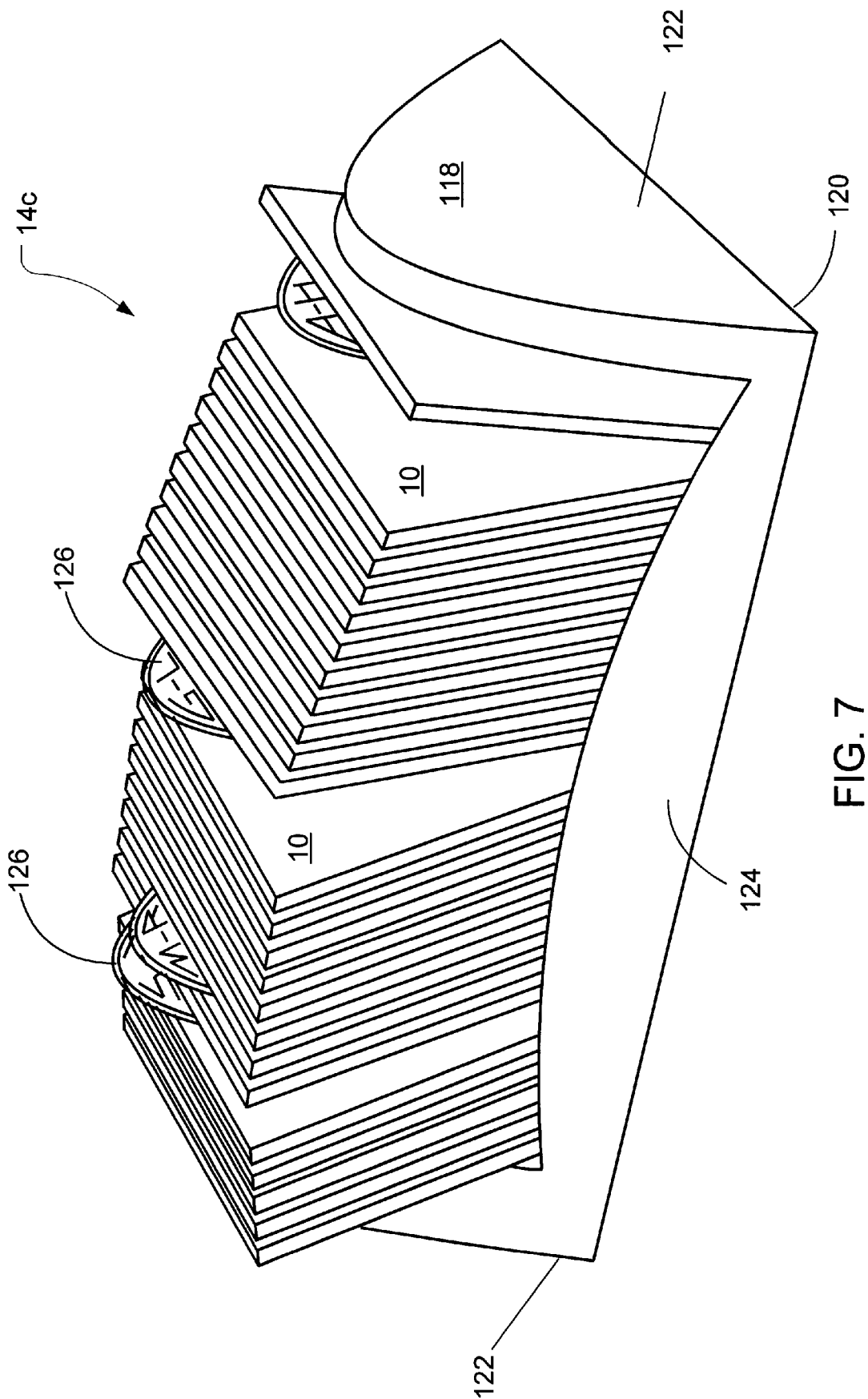
FIG. 7 is a perspective view of a tray style storage unit for loose storage of a number of the sleeves of FIG. 1.

FIG. 7 depicts a storage system 14c variation. A tray 118 is provided which is suitable for loose storage and display of a multiplicity of sleeves 10. The tray 118 has a base 120, end walls 122 and side walls 124. The inside the tray 118 the base 120 may optionally have an upward arc shape (the case in FIG. 7) to facilitate easy roll-and-tumble type access to sleeves 10 stored in the tray 118. Optional indexing separators 126 may also be provided.

In addition to the above mentioned examples, various other modifications and alterations of the inventive sleeves 10, the spines 12, and the storage system 14a–c may be made without departing from the invention. Accordingly, the above disclosure is not to be considered as limiting and the appended claims are to be interpreted as encompassing the entire spirit and scope of the invention.

INDUSTRIAL APPLICABILITY

The present sleeves 10 are well suited for application in storage of SM 22 which include DM 24, CM 26 and ML 28. If desired, the sleeves 10 may be constructed to alternately accept these types of contents interchangeably, thus serving a need for storage in which such contents can be associated as desired. The sleeves 10 are compact in size relative to conventional point-of sale storage containers used for SM 22, as well as being compact in size relative to many currently used storage systems. This permits users of the inventive sleeves 10 greater storage "density" than is available with such prior art. In particular, this should be of interest to users who have built up sizable libraries or who seek to compactly transport a multiplicity of SM 22. When the sleeves 10 are used in concert with the spines 12, or are stored in the variations of the storage system 14a–c logical orderings of the SM 22 can easily be made, thus effectively "indexing" a library. Great durability and protection for spine 12 mounted sleeves 10 and their contents can also further be had by containing them in the storage system 14a–c.

All portions of the embodiments presented herein (e.g., sleeves 10, spine 12, and the storage system 14a–c) may all be made of common and inexpensive materials. The inventors anticipate that plastic will be the primary material of choice for most of these (although fabric is also an excellent choice for wallets 108), since some varieties of it are transparent and others are non-scratching relative to sensitive exposed surfaces on some types of the anticipated contents. Further, conventional plastic molding techniques combined with either snap-together, sonic weld-together, or glue-together assembly are quite appropriate for constructing these components of the present invention.

For the above, and other, reasons, it is expected that the present invention will have widespread industrial applicability, and it is expected that the commercial utility of the invention will be extensive and long lasting.

We claim:

1. A storage system for storing a plurality of storage media, comprising:
   a plurality of substantially rectangular sleeves which are suitable for each insertably receiving and storing at least one instance of the storage media within a storage pocket between two flat cover plates, wherein said sleeve and each said cover plate have defined an entry edge where the storage media enters said storage pocket, a back edge opposite said entry edge, and side edges extending between said entry edge and said back edge;
   a plurality of vertebrae each including a mounting track suitable for mountably receiving one of said sleeves at a mounting edge which is selected from the groups consisting of said back edge and said side edges, such that said mounting track and said mounting edge are held in a substantially parallel mated relationship;
   a spine connected to said plurality of vertebrae; and
   a housing suitable for containing an assemblage of said spine, said vertebrae, and said sleeves.

2. The storage system of claim 1, wherein:
   said housing includes two clam-shell case members connected by a hinge; and
   said spine is connected to said hinge.

3. The storage system of claim 1, wherein:
   said housing includes a pair of flexibly connected wallet type wall members each including a pocket; and
   said spine includes a pair of end flaps loosely each inserted into and retained in one said pocket.

4. The storage system of claim 3, further comprising a closing mechanism, to attach portions of said wall members together and thus enclose said assemblage.

5. The storage system of claim 4, wherein said closing mechanism includes a member of the set consisting of zippers, tongue in groove attachment systems, and hook and loop attachment systems.

6. A sleeve for storing storage media, the sleeve being optionally mountable on a mounting track, the sleeve comprising:
   a pair of substantially rectangular cover plates;
   means for connecting said cover plates such that a substantially rectangular storage pocket is formed having an open entry edge, having a closed back edge opposite said entry edge, and also having two closed side edges extending between said entry edge and said side edges;
   mounting means for mounting the sleeve onto the mounting track at a mounting edge, wherein said mounting edge is selected from the group consisting of said back edge and said side edges; and
   wherein said mounting means includes at least one tang extending from at least one of said cover plates such that a lengthwise mounting slot is formed on said mounting edge, for engagement with the mounting track.

7. The sleeve of claim 6, wherein said cover plates are made of material which is substantially transparent, so that a user may read the surface of the storage media stored within said storage pocket.

8. The sleeve of claim 6, wherein at least one said cover plate has defined an access slot, to provide users easy access for withdrawal of the storage media in said storage pocket of the sleeve.

9. The sleeve of claim 6, wherein said means for connecting said cover plates includes molding the sleeve as a single piece.

10. The sleeve of claim 6, wherein:
    said cover plates are two discrete pieces; and
    said means for connecting said cover plates includes a member of the set consisting of interlocking tongues and grooves, sonic welding, and gluing said cover plates together.

11. The sleeve of claim 6, wherein said mounting means includes at least one tang extending from each cover plate such that a mounting slot is formed, for engagement with the mounting track.

12. The sleeve of claim 6, further comprising:
    a substrate plate sandwiched between said cover plates such that said storage pocket becomes two sub-pockets, for storage of two instances of the storage media; and
    substrate retaining means for retaining the substrate between said cover plates.

13. The sleeve of claim 12, wherein:
    said substrate plate is made non-scratching, to protect data stored in an exposed manner on the storage media.

14. The sleeve of claim 12, wherein:
    said side edges each include at least one recess; and
    said substrate retaining means includes a plurality of extensions suitable for engaging with said recesses.

15. The sleeve of claim 6, further comprising media retaining means for retaining the storage media in said storage pocket.

16. The sleeve of claim 15, wherein said media retaining means includes suitable separation between said cover plates such that the storage media is pressably engaged between said cover plates.

17. The sleeve of claim 15, wherein said media retaining means includes a plurality of engagement rails extending from at least one of said cover plates into said storage pocket, to pressably engage the storage media.

18. The sleeve of claim 15, wherein:
    said media retaining means includes at least one projection extending from at least one of said cover plates into said storage pocket; and
    said projection is suitably shaped to engage with a particular feature of the storage media in an interlocking manner.

19. The sleeve of claim 15, wherein said media retaining means includes an override bump on at least one of said side edges, for engaging a corresponding edge of the storage media as it is inserted into and extracted from said storage pocket.

20. The sleeve of claim 19, wherein said override bump is located on a flexible rib, such that the storage media presses said override bump aside against counteracting spring pressure from said rib.

21. The sleeve of claim 19, wherein said override bump is located suitably intermediate along said side edge such that the storage media may be inserted substantially completely into said storage pocket before a dimensional feature of the storage media encounters and is just passed past said override bump.

22. The sleeve of claim 21, wherein:
    two said override bumps are provided, one on each side edge and each located 2 inches from said entry edge; and
    said override bumps extend 0.020–0.040 inches into said storage pocket, to retain within said storage pocket instances of the storage media which are compact disk size.

23. A spine for storing a plurality of media storage sleeves of claim 6, the spine comprising:
    a plurality of vertebrae;
    said vertebrae each including a mounting track suitable for mountably receiving one of the sleeves; and
    hinge means for flexibly attaching said vertebrae sequentially so that instances of the sleeves are mounted and can be moved in the manner of pages of a book.

24. The spine of claim 23, wherein each said mounting track includes sleeve retaining means for retaining the sleeve once mounted.

25. A storage system for storing a plurality of storage media, comprising:
    a spine and sleeve assembly including a plurality of substantially rectangular sleeves which are suitable for each insertably receiving and storing at least one instance of the storage media within a storage pocket between two cover plates, a spine including a plurality of vertebrae, wherein each sleeve is attached to a respective one of said vertebrae at an edge thereof, said plurality of vertebrae being hingedly connected adjacent each other in a sequential manner for movement of said sleeves in a roll-and-tumble manner whereby movement of one sleeve and its attached vertebrae causes a following movement of an adjacent sleeve and its attached vertebrae.

26. The storage system of claim 25, further comprising:
    a housing suitable for containing said spine and sleeve assembly.

* * * * *